Patented Mar. 9, 1943

2,313,103

UNITED STATES PATENT OFFICE 2,313,103

ALKYLATION OF PARAFFIN HYDROCARBONS

Charles L. Thomas, Chicago, Ill., assignor to Universal Oil Products Company, Chicago, Ill., a corporation of Delaware No Drawing. Application March 25, 1939, Serial No. 264,117

8 Claims. (Cl. 196—10)

This invention relates particularly to the treatment of iso or branched chain paraffin hydrocarbons.

In a more specific sense the invention is concerned with a novel process for alkylating iso or branched chain paraffin hydrocarbons with olefinic hydrocarbons to produce saturated hydrocarbons of higher molecular weight which can be utilized as constituents of motor fuel.

The cracking process which is operated principally with the object of producing gasoline from heavier and less valuable petroleum fractions incidentally produces considerable yields of fixed gases consisting of hydrogen, methane, ethane, propane, and butanes, as well as ethylene, propene, and butenes in varying quantities and proportions. In most instances, these gases are considered to be valuable merely as fuel, although attempts have been made from time to time to utilize the olefinic constituents for the manufacture of hydrocarbon derivatives on a commercial basis.

In one application of the present process the isobutane and olefins present in cracked gas mixtures are utilized as a source of additional yields of motor fuel fractions to augment those produced primarily by cracking. While the process is applicable to the utilization of the hydrocarbons in cracked gas mixtures and particularly selected fractions produced therefrom in the stabilizers of cracking plants, it is also applicable to the treatment of iso or branched chain paraffins and olefins produced from any other source. Efforts to alkylate normal paraffin hydrocarbons with olefins in the presence of catalysts have thus far failed unless concurrent isomerization of the normal to branched chain paraffin occurs. Isobutane, however, may be made to interact with olefins to produce saturated products, and with butenes, particularly isobutene, in the presence of various catalysts to form branched chain octanes commonly referred to as "iso-octanes."

In one specific embodiment the present invention comprises a process for alkylating isoparaffin hydrocarbons with mono-olefinic hydrocarbons in the presence of fluorosulfonic acid as catalyst.

Whereas previous work in alkylating various classes of hydrocarbons with olefins has indicated that the reactions can be brought about in the presence of boron fluoride and minor amounts of hydrogen fluoride, these reactions are better effected when using fluorosulfonic acid as catalyst. During such alkylation reactions the maintenance of an excess of isoparaffin minimizes polymerization so that the products consist mainly of higher boiling isoparaffins formed by the reaction of the olefinic hydrocarbons with the isoparaffin charged.

One method of preparing fluorosulfonic acid, used as catalyst in the process of this invention, consists in treating fluorspar ($CaF_2$) with fuming sulfuric acid (50–60% $SO_3$). It is a mobile liquid with a boiling point of 163° C. and a faint pungent odor but with substantially no harmful action on dry skin. It feels greasy to the touch and is without the intense blistering action of anhydrous hydrogen fluoride.

The total reactions occurring when an isoparaffin is alkylated with an olefin in the presence of fluorosulfonic acid will necessarily involve, to some extent, not only simple alkylation corresponding to the addition of one or more molecules of the olefin to an isoparaffin, but also some reactions of polymerization and some decomposition so that the net result is the production of a mixture of hydrocarbons having a considerable boiling range, but containing a large proportion of mono-alkylated products. The reactions of polymerization are usually of a negligible order when a moderate excess of isoparaffin is present in the reaction zone.

In operating the process of the present invention the preferred procedure is to agitate a mixture of fluorosulfonic acid and an isoparaffin and introduce gradually a mixture of an olefin and an isoparaffin below the surface of the mixture of acid and isoparaffin while the reaction mixture is under a pressure sufficient to keep a substantial proportion of the reactants in liquid phase. A temperature range of approximately 0–100° C. and a pressure range of the order of 2–20 atmospheres has been found suitable in the alkylation of the lower boiling isoparaffins as isobutane and isopentane by normally gaseous olefins, but these operating conditions may be altered for effecting similar reactions between higher boiling paraffins and olefins of varied structures.

In batch operation of this process the agitation may be stopped and the upper hydrocarbon layer removed and fractionated to recover the unchanged paraffins and the desired alkylated products. Continuous operation of the process may be made by providing a mixing zone in which the isoparaffin, olefin, and acid catalyst are contacted for a sufficient time to effect the completion of the desired alkylation reactions, after which the mixture is separated in a settling zone from which the hydrocarbon layer may be withdrawn and fractionated to separate the desired products and to recover unconverted paraffin for recycling. From this settling zone the lower layer, consisting of the fluorosulfonic acid catalyst is pumped back to the reaction zone for further service.

In case a considerable portion of the alkylation product boils higher than the end point of commercial gasoline, fractionating of this hydrocarbon material may be made in two stages, the first stage, removing the uncombined 4-carbon atom hydrocarbons and being in effect a stabilization, and the second stage, distilling the gasoline boiling range material as an overhead. Details of such continuous procedures are more or less familiar to those conversant with oil refinery operations, and other procedures than those mentioned may suggest themselves which can be made without departing from the general broad scope of the invention.

The process of the present invention may be utilized successfully to produce octanes which are largely of an isomeric character from the mixtures of 4-carbon atom hydrocarbons which are obtainable either by the dehydrogenation of butanes, the close fractionation of cracked gas mixture such as those produced as overhead from cracking plant stabilizers, or by utilizing a secondary cut of the overhead from the stabilizers which consist principally of the desired 4-carbon atom hydrocarbons, including isobutene, normal butenes, isobutane, and normal butane.

In the treatment of such hydrocarbon mixtures with an alkylation catalyst, such as fluorosulfonic acid, the primary reactions involve principally the interaction of the isoparaffins with the olefins. Obviously the above procedure for utilizing the isobutane and butenes in 4-carbon atom hydrocarbon fractions, can be followed only when there is a sufficient amount of isobutane to react with both the isobutene and n-butenes present. The process of the present invention, if desired, may be carried out on isobutane and n-butenes separated by fractionation and solvent extraction methods from 4-carbon atom hydrocarbon fractions. For example, the olefins may be concentrated by their preferential solubility in various types of hydrocarbon and other solvents, and the olefin concentrate fractionated to substantially separate isobutene from n-butenes. Similarly, isobutane and n-butane may be separated by the fractionation of the raffinate. For the proper functioning of a process of the present character it is usually advisable to employ these preliminary separation methods to be able to proportion the isobutane and butenes to avoid any tendency for polymerization reactions to occur.

In the presence of an excess of isobutane, one molecular equivalent of n-butene tends to react with its molecular equivalent of isobutane while the excess of isobutane remains unaffected. When more butene is used than corresponds to about one mole to two moles of isobutane, there is an increased tendency for polymerization reactions to occur in preference to alkylation reactions. This is to be expected to some extent on account of the readiness with which butenes alone are polymerized by acid catalysts. However, by maintaining the proper excess of isoparaffin hydrocarbon the course of the reactions may be kept principally in the direction of production of alkylated products of a saturated rather than an olefinic character. Besides the primary reaction of an isoparaffin with an olefin there is also some production of higher boiling products due to the reaction of one molecule of an isoparaffin with two molecules of an olefin forming a dialkylated paraffin.

The following examples are given to indicate typical results obtainable in the operation of the process, although not with the intention of unduly limiting the scope of the invention.

*Example I*

A mixture of 180 parts by weight of isobutane and 162 parts by weight of isobutene was contacted with 100 parts by weight of fluorosulfonic acid during two hours at a temperature of 15° C. under a pressure which varied between 3.5 and 4.5 atmospheres. After the reaction 220 parts by weight of a liquid hydrocarbon product was recovered equivalent to 135% by weight of the olefin charged to the reaction. This hydrocarbon product consisted essentially of paraffinic hydrocarbons, 90% by volume thereof being in the gasoline boiling range, of which a total of 60% by volume was aviation gasoline with a boiling range of from 35 to 150° C., and included approximately 27% of iso octanes, 18% iso nonanes.

*Example II*

Isobutane and fluorosulfonic acid were agitated at room temperature and elevated pressure, and propene, in less than equivalent amount run in, the temperature then being maintained at about 25° C. and the pressure approximately 10 atmospheres. The resultant liquid product was thereafter separated by decantation from the catalyst, washed with water and dried, and found to be essentially isoheptanes.

The character of the process of the present invention, and particularly its commercial value, are evident from the preceding specification and data presented, although neither section is intended to unduly limit its generally broad scope.

I claim as my invention:

1. A process for synthesizing hydrocarbons which comprises alkylating an isoparaffin with an olefin in the presence of fluorosulfonic acid.

2. A process for producing liquid hydrocarbons from hydrocarbon gases which comprises alkylating a normally gaseous isoparaffin with a normally gaseous olefin in the presence of fluorosulfonic acid.

3. A process for producing hydrocarbons boiling in the gasoline range which comprises alkylating isobutane with a normally gaseous olefin in the presence of fluorosulfonic acid.

4. A process for producing octanes which comprises alkylating isobutane with a butane in the presence of fluorosulfonic acid.

5. A process for converting normally gaseous into normally liquid hydrocarbons which comprises alkylating a normally gaseous isoparaffin with a normally gaseous mono-olefin in the presence of fluorosulfonic acid, while maintaining a substantial portion of the said reactants in the liquid phase.

6. A process for producing octanes which comprises alkylating isobutane with isobutene in the presence of fluorosulfonic acid at a temperature of the approximate order of 0–100° C. under a pressure in the approximate range of 2–20 atmospheres.

7. A process for producing octanes which comprises alkylating isobutane with normal butenes in the presence of fluorosulfonic acid at a temperature of the approximate order of 0–100° C. under a pressure in the approximate range of 2–20 atmospheres.

8. A process for producing heptanes which comprises alkylating isobutane with propene in the presence of fluorosulfonic acid at a temperature of the approximate order of 0–100° C. under a pressure in the approximate range of 2–20 atmospheres.

CHARLES L. THOMAS.

CERTIFICATE OF CORRECTION.

Patent No. 2,313,103. March 9, 1943.

CHARLES L. THOMAS.

It is hereby certifed that error appears in the printed specification of the above numbered patent requiring correction as follows: Page 2, second column, line 46, claim 4, for "butane" read --butene--; and that the said Letters Patent should be read with this correction therein that the same may conform to the record of the case in the Patent Office.

Signed and sealed this 26th day of October, A. D. 1943.

Henry Van Arsdale,
Acting Commissioner of Patents.

(Seal)